(12) United States Patent
Stecher et al.

(10) Patent No.: US 11,034,434 B2
(45) Date of Patent: Jun. 15, 2021

(54) WING FOR AN AIRCRAFT

(71) Applicant: Airbus Operations GmbH, Hamburg (DE)

(72) Inventors: Lars Stecher, Hamburg (DE); Martin Fees, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 277 days.

(21) Appl. No.: 16/104,158

(22) Filed: Aug. 17, 2018

(65) Prior Publication Data

US 2019/0061912 A1   Feb. 28, 2019

(30) Foreign Application Priority Data

Aug. 18, 2017 (DE) .................. 10 2017 118 979.3

(51) Int. Cl.
*B64C 9/24* (2006.01)
*B64C 3/50* (2006.01)
(Continued)

(52) U.S. Cl.
CPC ............. *B64C 9/24* (2013.01); *B64C 3/50* (2013.01); *B64C 9/02* (2013.01); *B64C 9/22* (2013.01); *B64C 2003/146* (2013.01)

(58) Field of Classification Search
CPC .... B64C 3/50; B64C 9/22; B64C 9/02; B64C 2003/146; B64C 9/24; B64C 13/28; B64C 13/34; B64C 9/06
See application file for complete search history.

(56) References Cited

U.S. PATENT DOCUMENTS 2,000,666 A   5/1935   Osborn et al.
3,743,219 A * 7/1973   Gorges ..................... B64C 9/24
                                                244/210
(Continued)

FOREIGN PATENT DOCUMENTS

DE   102011105912 A1   1/2013
EP     3 106 386 A1   12/2016
WO   WO 2013/074009 A1   5/2013

OTHER PUBLICATIONS

German Search Report for German Application No. 10 2017118979.3 dated Apr. 19, 2018.
(Continued)

*Primary Examiner* — Medhat Badawi
*Assistant Examiner* — Vicente Rodriguez
(74) *Attorney, Agent, or Firm* — Jenkins, Wilson, Taylor & Hunt, P.A.

(57) ABSTRACT

A wing for an aircraft, including a main wing, a slat, and a connection assembly movably connecting the slat to the main wing, the slat movable between a retracted and at least one extended position. The connection assembly includes an elongate slat track. A wing has a connection assembly without requiring the front spar being penetrated. The slat track has a first end mounted to the slat and a second end guided at the main wing for movement along a predetermined path extending in a direction from a front spar to a leading edge of the main wing and from a lower side to an upper side of the main wing. Between the first and second ends the slat track is mounted to the main wing allowing translation of the slat track and rotation of the slat track about a first axis of rotation parallel to the leading edge.

14 Claims, 4 Drawing Sheets

(51) Int. Cl.
*B64C 9/22* (2006.01)
*B64C 9/02* (2006.01)
B64C 3/14 (2006.01)

(56) References Cited

U.S. PATENT DOCUMENTS

| | | | | |
|---|---|---|---|---|
| 4,399,970 | A * | 8/1983 | Evans | B64C 9/24 |
| | | | | 244/214 |
| 4,915,327 | A * | 4/1990 | Ellmers | B64C 13/30 |
| | | | | 244/210 |
| 7,249,735 | B2 | 7/2007 | Amorosi et al. | |
| 7,578,484 | B2 * | 8/2009 | Fox | B64C 9/22 |
| | | | | 244/214 |
| 8,967,549 | B2 * | 3/2015 | Cathelain | B64C 9/24 |
| | | | | 244/214 |
| 9,016,637 | B2 * | 4/2015 | Sakurai | B64C 9/24 |
| | | | | 244/214 |
| 9,334,043 | B2 | 5/2016 | Schlipf et al. | |
| 2007/0034747 | A1 | 2/2007 | Amorosi et al. | |
| 2010/0084515 | A1 * | 4/2010 | Jaggard | B64C 9/22 |
| | | | | 244/214 |
| 2010/0187368 | A1 * | 7/2010 | Cathelain | B64C 9/24 |
| | | | | 244/214 |
| 2017/0073082 | A1 | 3/2017 | Ungar et al. | |

OTHER PUBLICATIONS

Extended European Search Report for Application No. 18186275.6 dated Nov. 16, 2018.

* cited by examiner

WING FOR AN AIRCRAFT

CROSS-REFERENCE TO RELATED APPLICATION

This application claims priority to German Patent Application No. 10 2017 118 979.3 filed Aug. 18, 2017, the entire disclosure of which is incorporated by reference herein.

TECHNICAL FIELD

The disclosure herein relates to a wing for an aircraft, comprising a main wing, a slat, and a connection assembly movably connecting the slat to the main wing, such that the slat is movable between a retracted position and at least one extended position. Further aspects of the disclosure herein relate to an aircraft comprising such a wing, and to a connection assembly configured for connecting a slat to a main wing of an aircraft.

BACKGROUND

The connection assembly comprises an elongate slat track fixedly mounted to the slat and movably mounted to the main wing. Such slat tracks are known in the art and usually comprise a toothed rack that is engaged by a drive pinion mounted to the main wing, so that the slat track can be moved along its longitudinal axis between the retracted position and the extended position. Usually, rollers are provided at the main wing to guide the slat track from opposite sides during movement along its longitudinal axis. Such translational movement of the slat track requires that the slat track penetrates a front spar of the main wing when the slat is in the retracted position.

SUMMARY

Therefore, an object of the disclosure herein is to provide a wing having a connection assembly that does not require the front spar being penetrated. This object is achieved in that the slat track has a first end that is mounted to the slat and a second end that is guided at the main wing for movement along a predetermined path. The predetermined path extends in a direction from a front spar to a leading edge of the main wing, i.e. in a chord direction, and from a lower side to an upper side of the main wing, i.e. in a thickness direction. The leading edge extends as a line from a wing root to a wing tip. Further, between the first end and the second end the slat track is mounted to the main wing by a translational-rotational bearing that allows translation of the slat track along its longitudinal direction and that allows rotation of the slat track about a first axis of rotation parallel to the leading edge, i.e. parallel to a span direction, and that inhibits translation of the slat track normal to its longitudinal direction. The translational-rotational bearing is mounted to the main wing in a position further to the leading edge than the path.

In such a way, when the slat is moved between the retracted and the extended positions, the slat track does not only perform translational movement but also rotational movement, i.e. pivots about the first axis of rotation, so that the slat track can be formed with a shorter longitudinal extension and the front spar of the main wing does not need to be penetrated in the retracted position. This enables a more simple, reliable and safe design of the wing.

Preferably, the connection assembly is a first connection assembly and the wing comprises a second connection assembly formed essentially as the first connection assembly and connecting the slat to the main wing in a position spaced apart from the first connection assembly in the span direction, i.e. along the leading edge. Alternatively, the second connection assembly might also be formed different from the first connection assembly. Preferably, one slat is connected to the main by at least two connection assemblies, namely a first connection assembly and a second connection assembly.

According to a preferred embodiment, the slat track is driven by a drive unit for movement of the second end along the path. Preferably, the second end is moved by the drive unit. Alternatively, a drive unit for moving the slat relative to the main wing could be provided with an offset from the connection assembly in the span direction.

According to another preferred embodiment, the translational-rotational bearing is formed as a pair of rollers between which the slat track is guided from opposite sides. Preferably, the rollers have roller axes of rotation in parallel to the leading edge or to the span direction. In other words, one roller contacts an upper surface and another roller contacts a lower surface of the slat track. By such a roller pair a simple and effective translational-rotational bearing is provided where translation of the slat track along its longitudinal axis and rotation of the slat track about the first axis of rotation is enabled.

According to yet another preferred embodiment, the path is formed convex with respect to the leading edge. Preferably, the path is formed as a segment of a circle, wherein the circle has a center located between the front spar and the path. Preferably, the center is further located between the upper side of the main wing and the path. In such a way, an advantageous movement path of the slat is achieved.

According to another preferred embodiment, the path is defined by a trace to which the second end of the slat track is engaged. Such a trace may effectively guide the second end of the slat track along the path.

According to an alternative embodiment, the path is defined by a linkage. Such a linkage may effectively guide the second end of the slat track along the path.

In particular, it is preferred that the linkage comprises a first link. The first link is mounted to the main wing rotatably about a second axis of rotation and is mounted to the second end of the slat track rotatably about a third axis of rotation. The third axis of rotation is spaced apart from the first and second axes of rotation. Such a first link that is rotatably mounted to the main wing and rotatably mounted to the second end of the slat track, defines a path in the form of a segment of a circle for the second end of the slat track.

Preferably, the drive unit drives the first link for rotation about the second axis of rotation. In such a way, the first link forms a rotating actuator arm that moves the slat track along the path.

It is further preferred that the linkage comprises a second link driven by the drive unit and mounted to the first link rotatably about a fourth axis of rotation. Preferably, the fourth axis of rotation is positioned between the second axis of rotation and the third axis of rotation. By the second link movement of the first link can be initiated.

It is also preferred that the linkage comprises a third link mounted to the main wing rotatably about a fifth axis of rotation and mounted to the second link rotatably about a sixth axis of rotation. Preferably, the sixth axis of rotation is spaced apart from the fifth axis of rotation and from the fourth axis of rotation. Further, it is preferred that the fifth axis of rotation is positioned between the leading edge and the second axis of rotation. By the third link movement of the second link can be initiated.

In particular, it is preferred that the third link is driven by the drive unit, such as a rotary drive, about the fifth axis of rotation. In such a way, the third link is formed as a rotating arm that drives the second link, via the second link the first link, and via the first link finally the slat track.

It is particularly preferred that at least two of the first, second, third, fourth, fifth, and sixth axes of rotation, preferably all of them, extend in parallel to one another. It is also preferred that at least two of the first, second, third, fourth, fifth, and sixth axes of rotation, preferably all of them, extend in parallel to the leading edge or to the chord direction.

A further aspect of the disclosure herein relates to an aircraft comprising a wing according to any of the aforedescribed embodiments. The explanations and advantages presented in connection with the wing also apply with respect to the aircraft.

Yet a further aspect of the disclosure herein relates to a connection assembly configured for connecting a slat to a main wing of an aircraft such that the slat is movable between a retracted position and at least one extended position. The connection assembly comprises an elongate slat track configured for being fixedly mounted to the slat and configured for being movably mounted to the main wing. The slat track has a first end configured for being mounted to the slat and a second end configured for being guided at the main wing for movement along a predetermined path. The predetermined path extends in a direction from a front spar to a leading edge of the main wing and from a lower side to an upper side of the main wing. Between the first and second ends the slat track is configured for being mounted to the main wing by a translational-rotational bearing that allows translation of the slat track along its longitudinal direction and rotation of the slat track about a first axis of rotation parallel to the leading edge, and that inhibits translation of the slat track normal to its longitudinal direction.

BRIEF DESCRIPTION OF THE DRAWINGS

Hereinafter, a preferred embodiment of the disclosure herein is explained in more detail by example drawings.

DETAILED DESCRIPTION

Figure 1:
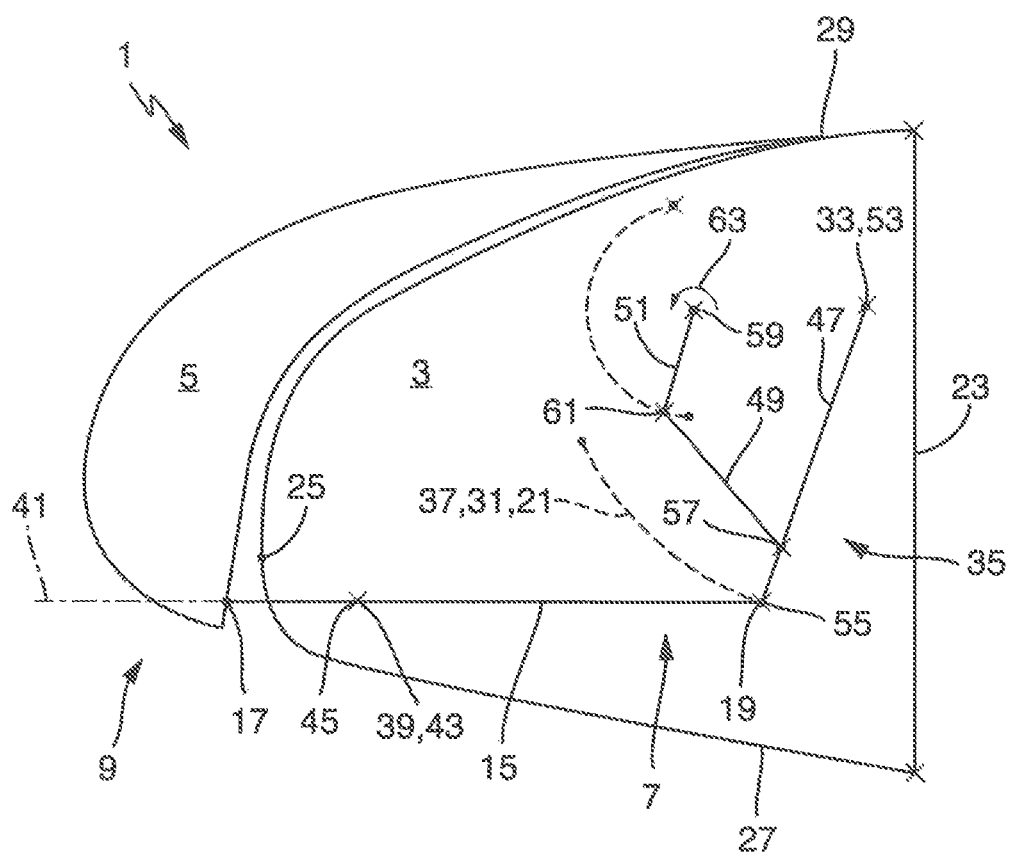
FIG. 1 is a schematic cross sectional view across the leading edge of a wing for an aircraft according to the disclosure herein, with the slat in a retracted position.
Figure 2:
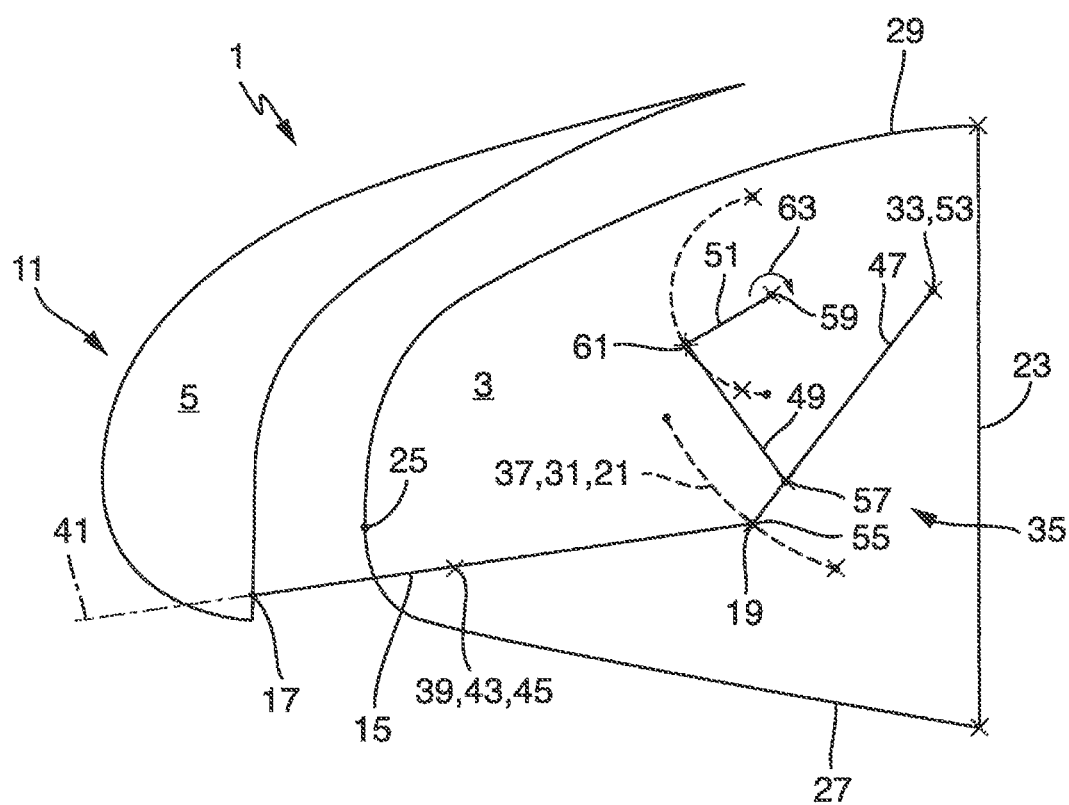
FIG. 2 is an illustration of the wing of FIG. 1 with the slat in a partially extended position.
Figure 3:
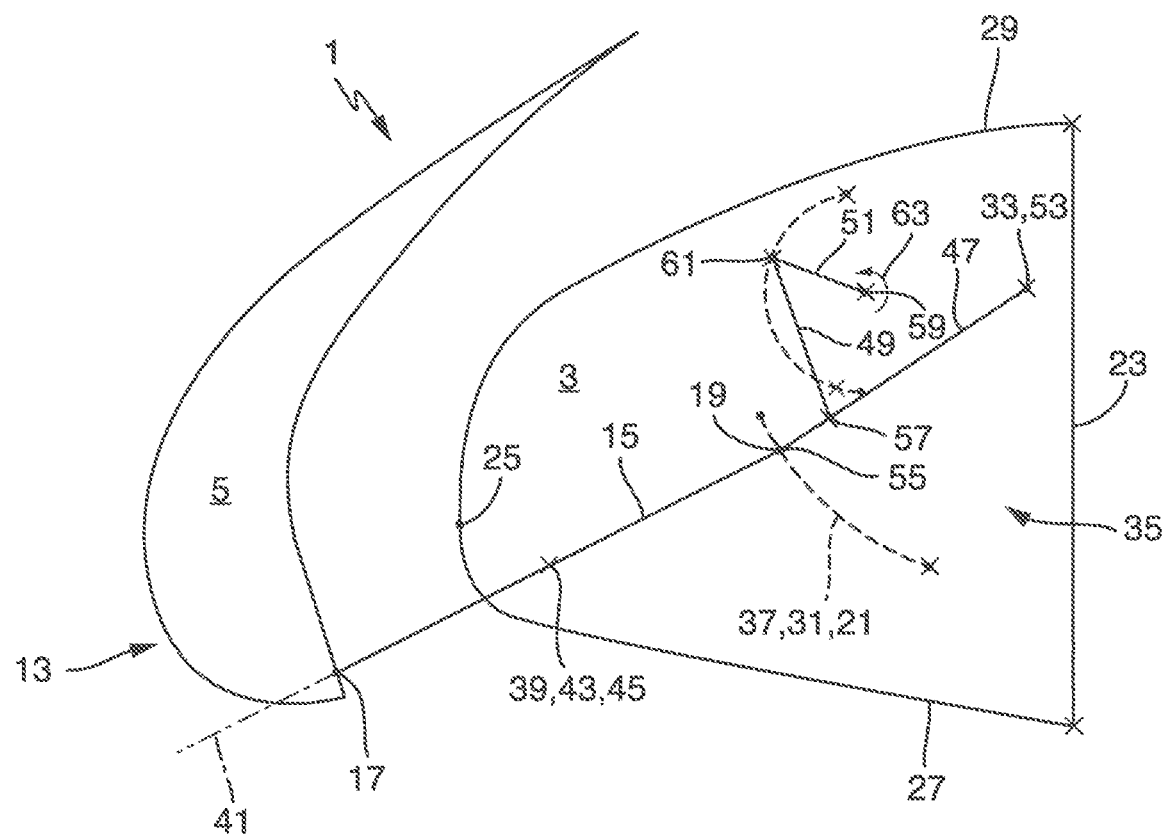
FIG. 3 is an illustration of the wing of FIG. 1 with the slat in a fully extended position.

In FIGS. 1-3 a wing 1 for an aircraft according to a preferred embodiment of the disclosure herein is illustrated. The wing 1 comprises a main wing 3, a slat 5, and a connection assembly 7 movably connecting the slat 5 to the main wing 3, such that the slat 5 is movable between a retracted position 9 (see FIG. 1), a partially extended position 11 (see FIG. 2), and a fully extended position 13 (see FIG. 3).

The connection assembly 7 comprises an elongate slat track 15 fixedly mounted to the slat 5 and movably mounted to the main wing 3. The slat track 15 has a first end 17 that is fixedly mounted to the slat 5 and a second end 19 that is guided at the main wing 3 for movement along a predetermined path 21. The path 21 extends in a direction from a front spar 23 to a leading edge 25 of the main wing 3 and from a lower side 27 to an upper side 29 of the main wing 3. The path 21 is formed convex with respect to the leading edge 25. More precise, the path 21 is formed as a segment of a circle 31, wherein the circle has a center 33 located between the front spar 23 and the path 21 and between the upper side 29 of the main wing 3 and the path 21. In the present embodiment, the path 21 is formed by a linkage 35. Additionally or alternatively, the path 21 might also be formed by a trace 37 that is engaged by the second end 19 of the slat track 15.

Between the first and second ends 17, 19 the slat track 15 is mounted to the main wing 3 by a translational-rotational bearing 39. The translational-rotational bearing 39 allows translation of the slat track 15 along its longitudinal direction 41 and rotation of the slat track 15 about a first axis of rotation 43 parallel to the leading edge 25. At the same time, the translational-rotational bearing 39 inhibits translation of the slat track 15 normal to its longitudinal direction 41. The translational-rotational bearing 39 is formed as a pair of rollers 45 between which the slat track 15 is guided from opposite sides. The rollers 45 have roller axes of rotation that extend in parallel to the leading edge 25.

The linkage 35 comprises a first link 47, a second link 49, and a third link 51. The first link 47 is mounted to the main wing 3 rotatably about a second axis of rotation 53. Further, the first link 47 is mounted to the second end 19 of the slat track 15 rotatably about a third axis of rotation 55 spaced apart from the first axis of rotation 43 and from the second axis of rotation 53. The second link 49 is mounted to the first link 47 rotatably about a fourth axis of rotation 57 positioned between the second axis of rotation 53 and the third axis of rotation 55. The third link 51 is mounted to the main wing 3 rotatably about a fifth axis of rotation 59 and is mounted to the second link 49 rotatably about a sixth axis of rotation 61. The sixth axis of rotation 61 is spaced apart from the fifth axis of rotation 59 and from the fourth axis of rotation 57. The fifth axis of rotation 59 is positioned between the leading edge 25 and the second axis of rotation 53. The first, second, third, fourth, fifth, and sixth axes of rotation 43, 53, 55, 57, 59 and 61 extend in parallel to one another and in parallel to the leading edge 25.

Further, the wing 1 comprises a drive unit 63 for driving the slat track 15 between the retracted and extended positions 9, 11, 13. Specifically, the drive unit 63 drives the slat track 15 for movement of the second end 19 along the path 21. The drive unit 63 is formed as a rotary drive that drives the third link 51 for movement about the fifth axis of rotation 59. The third link 51 drives the second link 49 and via the second link 49 the first link 47 that, in turn, drives the second end 19 of the slat track 15 for movement along the path 21. Such movement of the second end 19 of the slat track 15 along the path 21 causes the slat track 15 to carry out translation and rotation about the first axis of rotation 43 at the translational-rotational bearing 39 at the same time, which in turn causes the slat 5 to move between the retracted and the extended positions 9, 11, 13.

Figure 4:
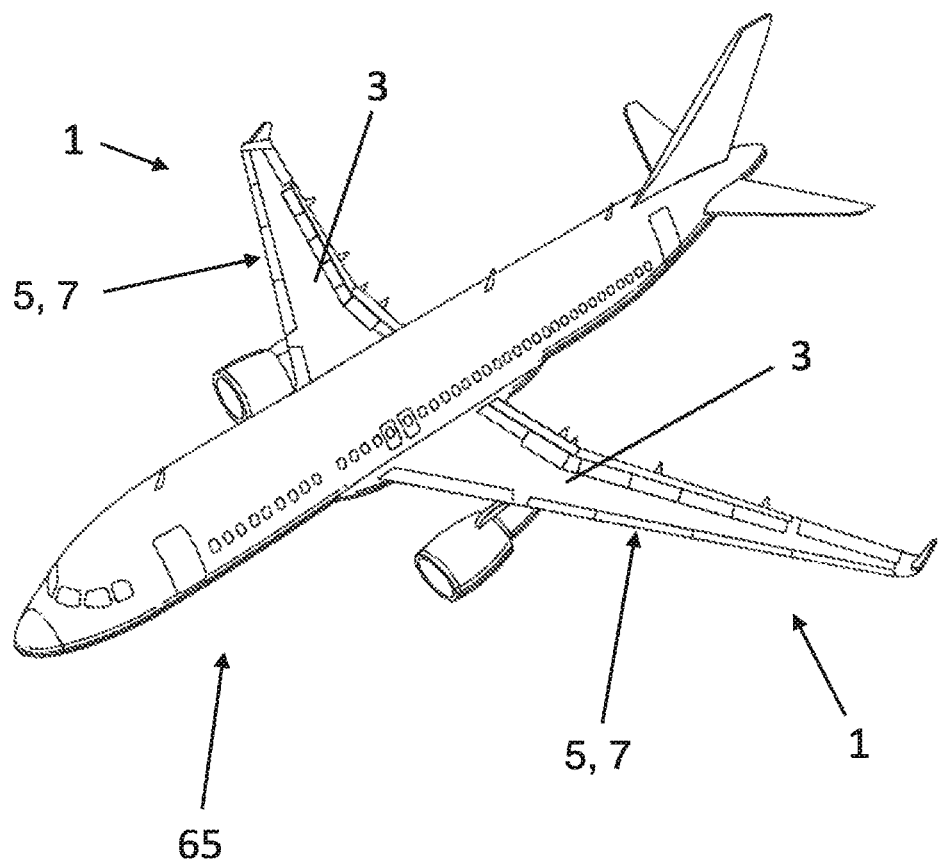
FIG. 4 is an illustration of an aircraft comprising the wing shown in FIG. 1.

In FIG. 4 an aircraft 65 according to the disclosure herein is shown. The aircraft 65 comprises opposite wings 1, wherein each wing 1 is formed as described above in connection with FIGS. 1 through 3 including a main wing 3, a slat 5, and a connection assembly 7 movably connecting the slat 5 to the main wing 3.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
   a main wing;
   a slat;
   a connection assembly movably connecting the slat to the main wing, such that the slat is movable between a retracted position and at least one extended position;
   the connection assembly comprising an elongate slat track fixedly mounted to the slat and movably mounted to the main wing;
   the slat track comprising a first end mounted to the slat and a second end guided at the main wing for movement along a predetermined path;
   the predetermined path extending in a direction from a front spar to a leading edge of the main wing and from a lower side to an upper side of the main wing;
   wherein, between the first and second ends, the slat track is mounted to the main wing by a translational-rotational bearing that allows translation of the slat track along a longitudinal direction of the slat track and rotation of the slat track about a first axis of rotation parallel to the leading edge, and that inhibits translation of the slat track normal to the longitudinal direction;
   wherein the translational-rotational bearing is formed as a pair of rollers between which the slat track is guided from opposite sides, wherein the rollers have roller axes of rotation in parallel to the leading edge.

2. The wing according to claim 1, wherein the slat track is driven by a drive unit for movement of the second end along the predetermined path.

3. The wing according to claim 1, wherein the predetermined path is formed convex with respect to the leading edge.

4. The wing according to claim 1, wherein the predetermined path is formed as a segment of a circle, wherein the circle has a center located between the front spar and the predetermined path.

5. The wing according to claim 1, wherein the predetermined path is defined by a trace.

6. The wing according to claim 1, wherein the predetermined path is defined by a linkage.

7. The wing according to claim 6, wherein the linkage comprises a first link, wherein the first link is mounted to the main wing rotatably about a second axis of rotation, and wherein the first link is mounted to the second end of the slat track rotatably about a third axis of rotation.

8. The wing according to claim 7, wherein the drive unit drives the first link for rotation about the second axis of rotation.

9. The wing according to claim 8, wherein the linkage comprises a second link driven by the drive unit and mounted to the first link rotatably about a fourth axis of rotation.

10. The wing according to claim 9, wherein the linkage comprises a third link mounted to the main wing rotatably about a fifth axis of rotation and mounted to the second link rotatably about a sixth axis of rotation.

11. The wing according to claim 10, wherein the third link is driven by the drive unit about the fifth axis of rotation.

12. The wing according to claim 10, wherein the first, second, third, fourth, fifth, and sixth axes of rotation extend in parallel to one another.

13. An aircraft comprising a wing according to claim 1.

14. A connection assembly for connecting a slat to a main wing of an aircraft such that the slat is movable between a retracted position and at least one extended position, the connection assembly comprising:
   an elongate slat track for fixedly mounting to the slat and for movably mounting to the main wing;
   wherein the slat track has a first end for mounting to the slat and a second end configured to be guided at the main wing for movement along a predetermined path,
   wherein the predetermined path extends in a direction from a front spar to a leading edge of the main wing and from a lower side to an upper side of the main wing,
   wherein between the first and second ends the slat track is configured to be mounted to the main wing by a translational-rotational bearing that allows translation of the slat track along a longitudinal direction of the slat track and rotation of the slat track about a first axis of rotation parallel to the leading edge, and that inhibits translation of the slat track normal to the longitudinal direction;
   wherein the translational-rotational bearing is formed as a pair of rollers between which the slat track is guided from opposite sides, wherein the rollers have roller axes of rotation in parallel to the leading edge.

\* \* \* \* \*